Jan. 16, 1951 C. S. HAZARD ET AL 2,538,243
AUTOMATIC BILLING MACHINE FOR DISPENSING LIQUID
Filed March 21, 1945 3 Sheets-Sheet 1
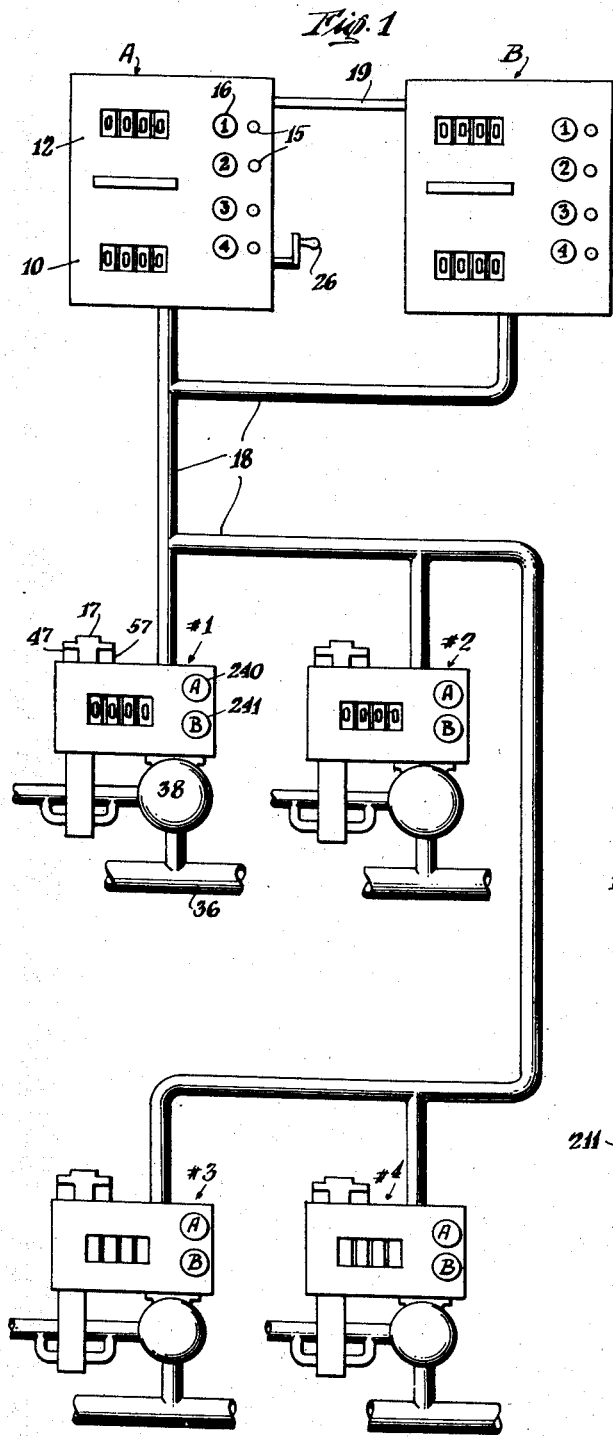
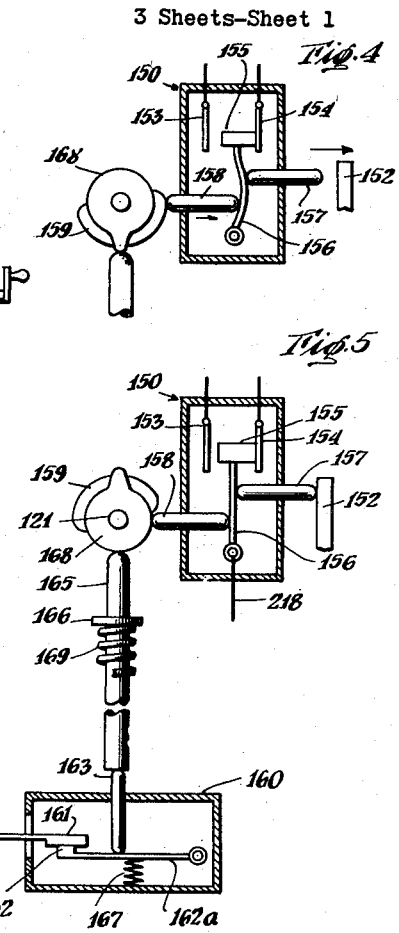
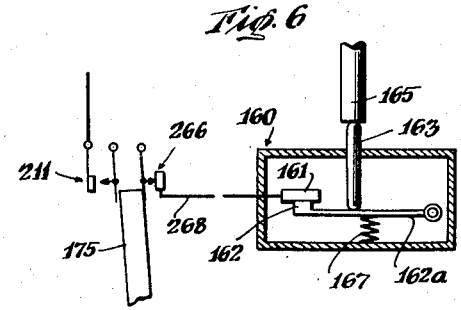
INVENTORS
*Charles S. Hazard*
BY *Johnson Shipman*
*George H. Corey*
ATTORNEY Jan. 16, 1951  C. S. HAZARD ET AL  2,538,243
AUTOMATIC BILLING MACHINE FOR DISPENSING LIQUID
Filed March 21, 1945  3 Sheets-Sheet 2
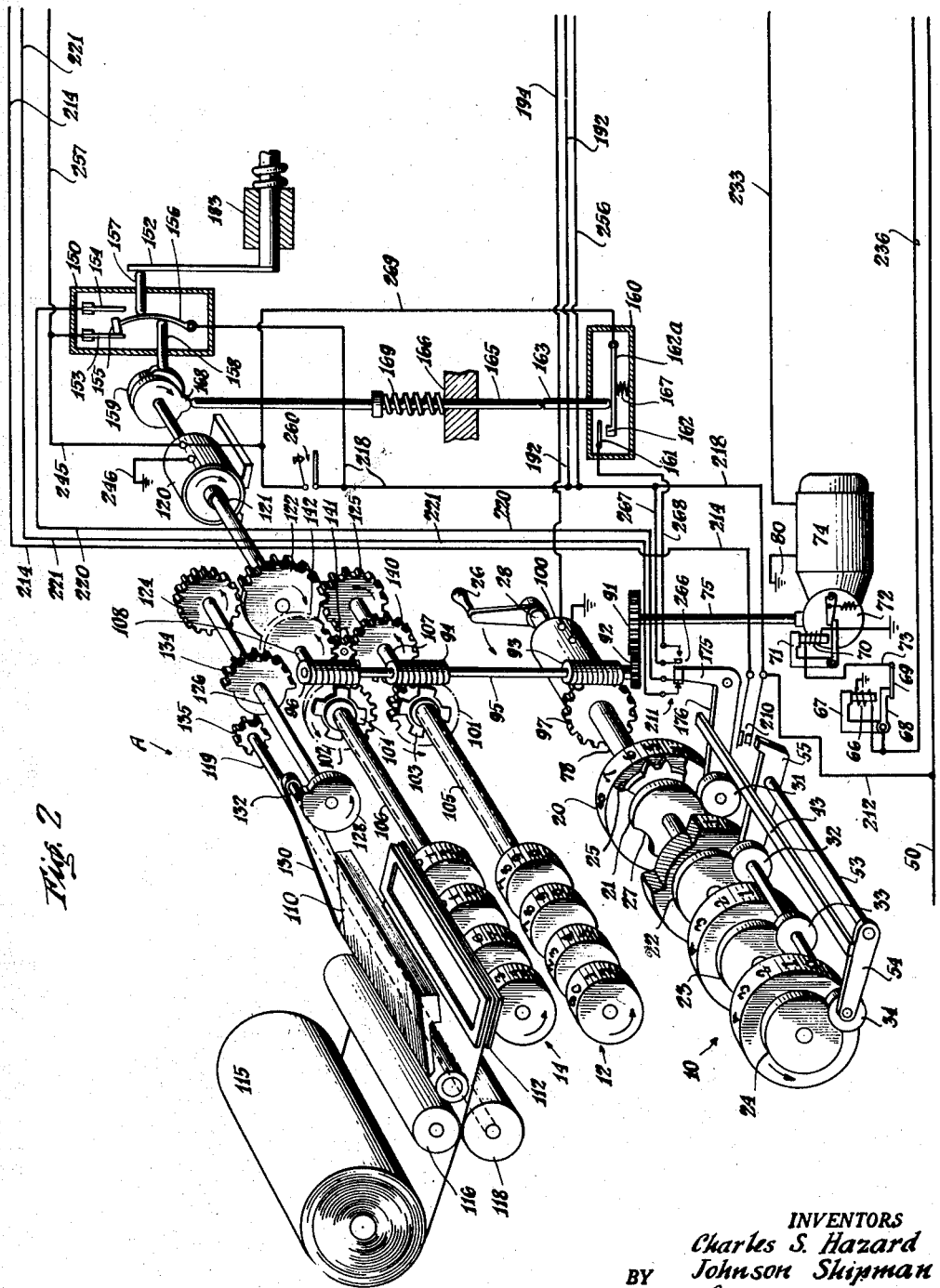
INVENTORS
Charles S. Hazard
BY Johnson Shipman
George H. Corey
ATTORNEY Jan. 16, 1951     C. S. HAZARD ET AL     2,538,243
AUTOMATIC BILLING MACHINE FOR DISPENSING LIQUID
Filed March 21, 1945     3 Sheets-Sheet 3
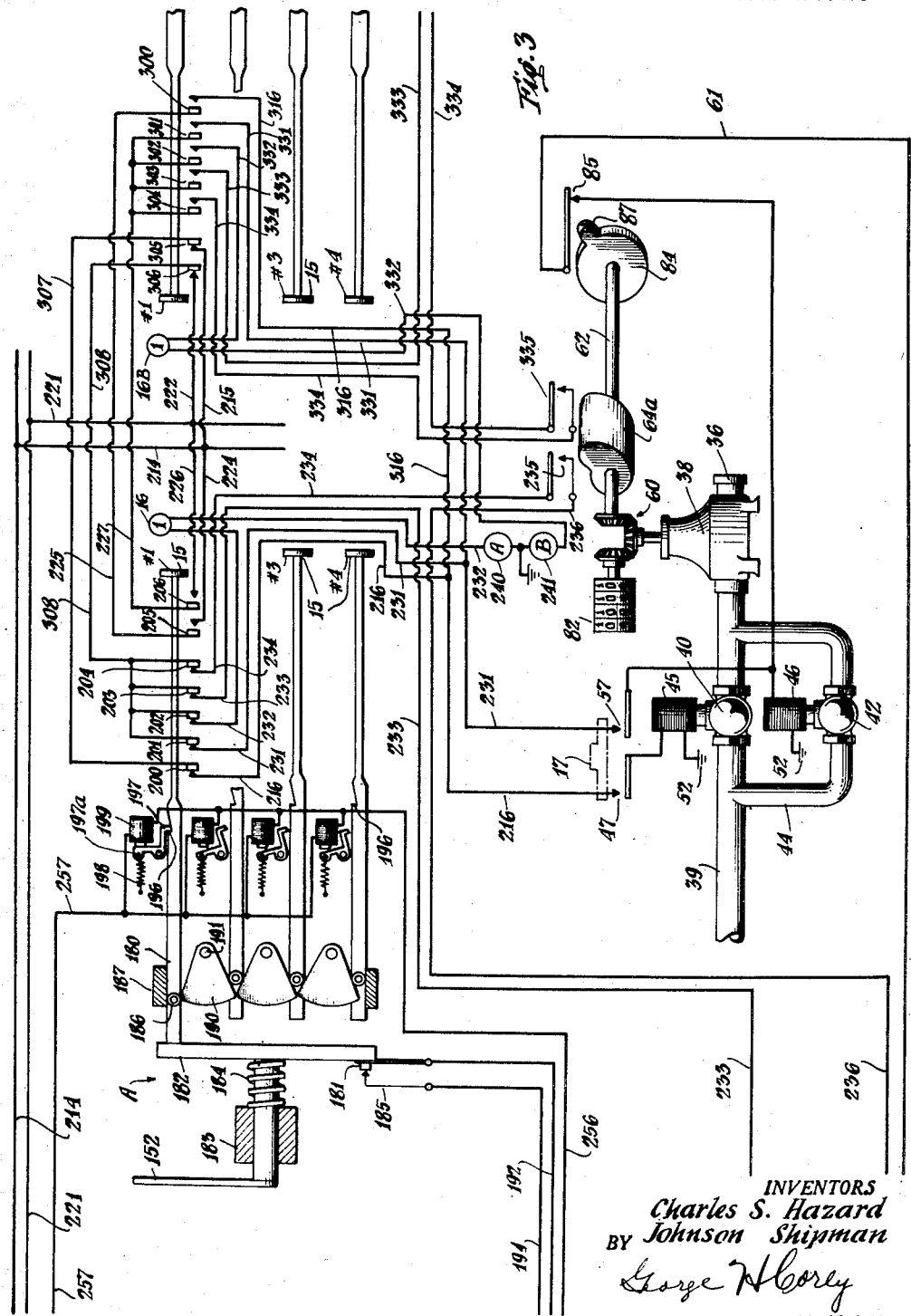
INVENTORS
*Charles S. Hazard*
BY *Johnson Shipman*
*George H Corey*
ATTORNEY Patented Jan. 16, 1951

2,538,243

UNITED STATES PATENT OFFICE 2,538,243

AUTOMATIC BILLING MACHINE FOR DISPENSING LIQUID

Charles S. Hazard, Andover, N. J., and Johnson Shipman, Flushing, N. Y., assignors to Neptune Meter Company, a corporation of New Jersey Application March 21, 1945, Serial No. 583,916

16 Claims. (Cl. 222—25)

This invention relates to dispensing apparatus and more particularly to means for automatically recording and billing amounts dispensed at a plurality of loading stations.

One of the objects of this invention is to provide one or more registers or billing machines, which may if desired be located at a central point, operable selectively to control and register the dispensing of material carried on at a plurality of loading stations.

Another object of this invention is to provide a billing machine which may be selectively connected to any one of a plurality of measuring devices, and when it is so connected it operates automatically to reset itself, and when the measuring step of a dispensing operation is completed, it operates automatically to stop delivery and issue a ticket with the amount of the delivery indicated thereon.

Another object of this invention is to provide a dispensing apparatus having one or more registers or billing machines selectively connectible to any one of a plurality of measuring devices and provided with means to prevent the simultaneous connection of more than one measuring device to a given register and to prevent the simultaneous connection of a given measuring device to more than one register.

Another object of this invention is to provide a control for measuring devices, selectively connectible to one or more registers, so that delivery of the dispensed material only in full unit measurements and recording thereof on the selected register are assured regardless of when, during the interval of measuring a unit measurement, discontinuance of delivery is initiated.

A further object of this invention is to provide a presettable auto-stop register selectively connectible to any one of a plurality of measuring devices and when so connected to be locked against change in the presetting thereof.

A still further object of the invention is to provide dispensing and registering apparatus in which an auto-stop control for a measuring device and a printing wheel, also if desired a visual register, driven concomitantly with the auto-stop are selectively operably connectible to any one of a plurality of measuring devices, said auto-stop being effective to control the measurement of the material dispensed and thereafter to initiate printing of the registered amount and release of the selective setting.

The foregoing and other objects of this invention are accomplished by providing one or more billing machines which may be at a central point each of which is selectively connectible to any one of a plurality of measuring devices which may be remotely located with respect to such central point or with respect to any one or all of said machines however located. Each billing machine comprises a presettable auto-stop register and recording and registering devices. For recording a printing mechanism, operable at the end of a predetermined operation to issue a ticket with the amount dispensed indicated thereon, may be used. If desired, the machine may include a visual register to indicate the amounts being delivered. For automatic operation a motor may be provided to reset the printing elements and return the visual register to zero from a previous recording and registering operation. For remote control the billing machine may have a power drive adapted to be controlled by the measuring device to which the machine is connected.

The selective feature of the invention comprises the provision of a plurality of manually actuatable elements or buttons for each billing machine. Each button may be provided with a plurality of contacts which, when closed, electrically connect the machine with which the buttons are associated to a measuring device which corresponds to the particular button actuated. The buttons of each machine are provided with interlocking means whereby only one button of a machine can be actuated at a time. Interlocking means are also provided between the corresponding buttons of the billing machines, where more than one machine is connected in the system, so that the same measuring device cannot be connected to more than one billing machine at a time. When a selected button is pressed it effects preparatory conditioning of the billing machine, that is to say, among other actions it sets certain parts in motion to reset the register and printing elements of the machine to zero. It also sets certain parts to condition the apparatus for the measuring operation.

Any suitable measuring device may be used in the system depending upon the nature and form of the material that is to be dispensed or otherwise measured and handled. The invention will be described in connection with material to be handled which is in fluid form. In such case each measuring device may comprise a suitable fluid meter and one or more delivery controlling elements, such as valves. Two or more valves may be used in parallel in order to secure reduced flow by operation of one prior to the final cutoff operation of the other. A cam or other suitable driven element is connected to the meter shaft to actuate means, preferably contacts in an electric circuit, for unit driving operation of the registering parts of the machine.

As described in our copending application Serial No. 448,644, filed June 26, 1942, of which this application is a continuation in part, the metering apparatus may be provided with a unit measurement synchronizing control whereby full unit measurements are assured regardless of when, during a current unit measurement, discontinuance of delivery is initiated and regardless of whether accomplished manually or automatically by the machine. This feature may include a synchronizing circuit connected in parallel with a main control circuit, the synchronizing circuit being deenergized momentarily at the end of each unit or other given cyclic operation of the meter during the period while the main circuit is under control of the auto-stop portion of the machine. A manually controlled valve may also be provided in the main circuit so that the driver of the vehicle receiving the commodity dispensed or an attendant may initiate discontinuance of delivery.

As disclosed in said application Serial No. 448,644, the registers may be operated in intermittent step by step manner during integrating operation thereof under control of the measuring device. A time differential is provided between actuation of the registers of the machine, on the one hand, and the cyclic deenergization of the synchronizing circuit on the other hand. This relationship enables the machine, when a predetermined amount has been registered thereon, to initiate discontinuance of the delivery prior to the completion by the meter of measurement of the last unit of measurement. The cyclic deenergization of the synchronizing circuit lags behind the machine registration so that, when the machine deenergizes the main control circuit to the fluid control valve, the valve will not close immediately but will remain open until the synchronizing circuit is deenergized by the meter at the completion of unit measurement.

This synchronizing unit measurement of the material dispensed, whereby cut-off can only be effected at the completion of measurement of a full unit, is important for accurate recording and delivery. This feature of full unit measurement secured by control of the delivery by both the meter and the registering devices of the machine above referred to may be combined in the present invention with the selective and interlocking features which are the principal subject thereof.

For a better understanding of the invention, reference may be had to the following detailed description which is to be read in connection with the accompanying drawings, in which:

Fig. 1 is a diagrammatical illustration of a dispensing system according to this invention;

Figs. 2 and 3 are schematic views which when combined show the essential elements of a billing machine coupled with a dispensing station together with a part of the selecting mechanism of a second billing machine, with indication of the interlocking controls between a plurality of such machines;

Fig. 4 is a vertical cross-sectional view of the upper control switch shown in Fig. 2 and illustrating a position of the parts thereof prior to the initiation of a dispensing operation;

Fig. 5 is a vertical cross-sectional view of the upper and lower control switches of Fig. 2 indicating the positioning of the parts thereof after a dispensing operation has been initiated, which positioning is maintained during the measuring operation; and Fig. 6 is a vertical cross-sectional view of the lower control switch of Figs. 2 and 5, showing the parts thereof and parts actuated by the auto-stop register in the positions to which they are moved at the end of a predetermined registration in the dispensing operation.

Referring to Figs. 1, 2 and 3 of the drawings, two billing machines A and B are shown associated with four dispensing or loading stations #1, #2, #3 and #4 of the type employed in distributing gasoline and other liquid petroleum products. Each billing machine is provided with an auto-stop register 10, a visual register 12, a series of printing wheels 14 and associated printing and controlling mechanisms. Selecting apparatus is also provided for each machine and includes a set of buttons 15, one for each of the dispensing or loading stations of the system.

As shown in Fig. 1, each billing machine of the system therein illustrated has four buttons, together with lamps 16 suitably numbered or colored to represent the particular loading station with which the button adjacent thereto is associated. When one of the buttons is pressed, the adjacent lamp is illuminated by the connection thereby established to the corresponding station and remains illuminated until the registration of the measured quantity is completed.

As described more fully hereinafter, the actuation of one of the buttons 15 will connect the billing machine thereof through electric circuits contained in the cable 18 to the loading station which corresponds to the button pressed. For example, should button #1 be pressed on machine A, the machine A will be connected to the loading station #1 and the liquid or other material dispensed at station #1 will be registered for recording and billing purposes on the machine A and only on this machine. To accomplish this control, when one of the buttons, such as the button #1, has been pressed on machine A, locking means hereinafter described interlock the buttons of said machine A and prevent other buttons on machine A from being pressed. Interlocking circuits indicated by the cable 19 also are provided between the several billing machines of the system so that when a button has been pressed on one machine, the pressing of the corresponding button on another billing machine of the system will be ineffective to connect said other machine to the selected loading station. Thus, only one billing machine can be connected to a given loading station at one time and after said loading station has been connected to said machine no other loading station can be connected to said billing machine at that time. Any billing machine, however, which is not already connected to a loading station may be connected to any other station which is not connected to a billing machine.

Referring now to Figs. 2 and 3 of the drawings, the driving and controlling relationship between the auto-stop register 10 of a billing machine and a measuring device 38 at a loading station will be described.

The auto-stop register 10 which is shown in some detail in Fig. 2 comprises a series of number wheels in which the units wheel 20 has associated therewith a cam 21, the tens wheel has a cam 22, the hundreds wheel has a cam 23 and the thousands wheel has a cam 24. It will be understood, of course, that any suitable transfer mechanism, such as the usual Geneva gearing partially indicated at 25, may be provided between adjacent number wheels so that a complete rotation of the number wheel of lower order will effect an advance movement of one step to the next adjacent number wheel of higher order. The number wheels of the auto-stop register may be preset by any suitable known mechanism, the presetting being made manually by a handle 26 and shaft 28. Thus preset, the number wheels of the register 10 indicate to the machine attendant the amount desired for a dispensing operation.

When the auto-stop register is preset to a desired number, the cams 21, and, if the amount to be dispensed is large enough, also cams 22, 23 and 24, as the case may be, will be moved so as to dislodge from the recesses 27 thereof the followers 31, 32, 33 and 34. In the zero position of the auto-stop register all of the followers are received in the recesses 27 of the cams. In Fig. 2 the auto-stop register is shown preset with the units wheel displaying the number 5 and with the higher order wheels still at zero positions. If the higher order wheels were not at zero, however, the follower 31 would be prevented from entering the recess 27 of the units wheel until after the followers 32, 33 and 34 mounted on the rack 54 pivoted on shaft 53 have entered the respective recesses of the cams 22, 23 and 24. This restriction upon the follower 31 is accomplished by an extension bar 43 of the rack 54 which overlies the arm 176 which supports the follower 31.

The loading station may comprise any suitable source of supply, such as a pipe 36, as in the case of a liquid dispensing system, and a suitable measuring device, such as a meter 38. As shown in Fig. 3, delivery pipe 39 is connected to the discharge side of the meter 38 and is provided with a main valve 40 and a by-pass connection 44 having an auxiliary valve 42.

While two valves are shown in the present illustration, it will be understood that one valve only of suitable construction may be used. The purpose of the two valves in the system illustrated is to reduce the flow of liquid near the end of a predetermined dispensing operation and then to cut off the reduced flow at precisely the end of the last unit of measurement.

This control of the valves 40 and 42 is performed by means of electrical circuits the completion of which is under control of the followers 31, 32, 33 and 34 and the associated mechanism operated by the auto-stop register 10, this control, however, being dominated at the close of the metering operation by the synchronizing circuit above referred to controlled by the meter. The main valve 40 is operated by an electromagnetic coil 45 and the auxiliary valve 42 is operated by the electro-magnetic coil 46. As will be traced hereafter, the coil 45 is connected in series with the manually controlled switch 47 and with the auto-stop register controlled contacts 210 to a source of power provided by lead 50. The opposite side of the electromagnetic coil 45 is connected to ground at 52.

The coil 46 is similarly connected to the source of power 50 through the manually operated switch 57 in series with switch 211 operated from the units wheel 20 and through circuits hereafter described. The other side of the coil 46 also is connected to the ground at 52. A single manually actuated member 17 is provided for both of the switches 47 and 57 so that when it is desired to start delivery of the liquid both of the valves 40 and 42 will be put into operative condition to be opened simultaneously when the setting of the register 10 calls for actuation of both valves. In the particular setting of the register 10 illustrated in Fig. 2, actuation only of the valve 42 will take place upon movement of the units cam 21 from the zero position.

When the cams 22, 23 and 24 of the number wheels of order higher than the units wheel 20, if such higher order wheels also have been preset, have been returned to zero in response to a dispensing operation, the followers 32, 33 and 34 will move into the recesses of the respective cams 22, 23 and 24 and cause the follower rack 54 to rotate clockwise about the shaft or pivot 53, whereby the arm 55 opens the contacts 210.

Even though the manually actuated switches 47 and 57 are held closed either manually or by any suitable latch, the opening of the contacts 210 will deenergize the coil 45 to close the main valve 40. This will reduce the flow through the meter 38, the flow thereafter being under the control of the auxiliary valve 42. When the units wheel 20 reaches zero, the follower 31 will move into the recess 27 of the cam 21 and the resulting movement of the arm 176 will cause separation of the contacts 211 carried by the arm 175 of the bell crank of which arm 176 is the other arm. Since contacts 211 are connected in series with the manually controlled valve 57, as above mentioned, the opening of the contacts 211 normally would deenergize the coil 46 and close auxiliary valve 42. The final closing of the valve 42, however, is controlled by the synchronizing circuit 61 which, as shown in Figs. 2 and 3, connects the solenoid coil 46 through the contacts 85 to the lead 50 which provide the source of power. The operation of this synchronizing circuit 61 will be hereafter described.

As transmission of the driving relation between the meter 38 and the auto-stop register 10 is electrical in the embodiment of the invention being described, the auto-stop register may be located at a central office or at any desired location remote from the meter. This remote location of the meter and the register control illustrated in general diagrammatic arrangement in Fig. 1 may be utilized while embodying in the construction the features of selective connection between any one of a number of meters located at different loading stations, on the one hand, and the machine or machines, on the other hand, which are located at the central offices or at other locations as hereinabove referred to.

The meter 38 drives through suitable gearing 60 a shaft 62 which carries a cam 64a. Associated with the cam are two sets of contacts 235 and 335 in the embodiment of Fig. 3. The set 235 serves the billing machine A and the register and other parts associated therewith and actuated thereby. The set 335 serves billing machine B and the register and other parts associated therewith. Both sets, however, are operated by the same meter 38. The set 235 may be taken for description, one of which contacts 235 is connected by wires 234 and 221 and through auto register switch 211 to the source of electric current 50. The other of these contacts 235 is connected by wire 236 to the winding 66 of a time delay relay 67. The relay 67 has a movable contact 68 which is normally closed with a stationary contact 69, the movable contact 68 also being connected to the wire 236. The fixed contact 69 is connected by wire 73 to a winding 70 of a relay 71 adapted to operate a known type of clutch 72, which controls the drive between the motor 74 and the shaft 75. A suitable driving connection, which includes gears 91, 92 and worm 93, may be provided from the shaft 75 to a worm gear 97 carried by a sleeve 78 to transmit driving movement from the shaft 75 to the units wheel 20 of the register. The motor 74 operates continuously after the system is connected for operation by pressing of the button #1, the motor 74 being connected through auto-stop actuated switch 211 to the source of electric current 50 by wires 233 and 221 and also to the ground at 80.

If desired, a totalizer 82, as shown in Fig. 3, may be geared to the meter drive so that the person receiving the liquid delivered during a dispensing operation can observe at the loading station the amount dispensed.

The remote drive from the meter 38 to the auto-stop register 10 is accomplished by the closing of the contact 235 by the cam 64a once for each unit of measurement by the meter 38. This unit measurement may be of any desired quantity, such as a gallon or other suitable amount. As will be hereafter traced, when the contacts 235 are closed current is fed from the source 50 through switch 211 and the contacts set by pressing button #1 and through the coil 66 to ground. Simultaneously, current is fed through the contacts 68, 69 to the coil 70 of the relay 71. The time delay characteristics of the relay 67 are such as to permit passage of current through the contacts 68, 69 for a time interval sufficient only to actuate the clutch controlled relay 71 to effect transmission through the clutch 72 of a driving movement from the motor 74 to the units wheel 20 to advance the unit wheel only one unit indication. The time delay relay 67, therefore, opens the contacts 68, 69 after the required time interval to open the circuit to relay 71 and thereby insures the transmission of unit measurements even though the cam 64a should come to rest in a position closing the contact 235.

The registering movement of the auto-stop register thus is responsive generally to the meter operation to control the actuation of the valves 40 and 42 to discontinue delivery at the approach of the end of a predetermined measuring step of the dispensing operation. In order to insure the precise cutting off of the flow at the end of the last unit of measurement, however, the synchronizing circuit 61 is arranged to control jointly with the register 10 and its unit wheel 20 the closing of the valve 42. As described in our application Ser. No. 448,644, this unit measurement control feature of the synchronizing circuit is accomplished by providing a second cam 84 on the shaft 62 to control a pair of contacts 85. These contacts are connected in the circuit 61 which is connected at one end to the source of current 50 and at the other end to the coil 46 of the valve 42. To enable the synchronizing circuit to dominate the final closing of valve 42 the cams 64a and 84 are disposed upon the shaft 62 with the cam 64a ahead of the cam 84 in the direction of rotation, so that the cam 64a is adapted to close the contacts 235 prior to the opening by the cam 84 of the normally closed contacts 85. Thus completion of the registering by the registers 10, 12 and 14 of each unit of measurement and of the last such unit will be effected prior to the completion of the actual measurement by the meter of the units and said last unit.

When the last unit measurement for a predetermined quantity is registered on the units wheel 20, the main valve 40 being previously closed by opening of contacts 210, the follower 31 will move into the recess 27 of the cam 21, thereby opening the contacts 211 to deenergize the circuit leading to the coil 46 of the valve 42 prior to the actual completion of the measurement of the last unit. The coil 46, however, does not become deenergized by the opening of the contacts 211 but is maintained energized by the normally closed contacts 85 until the meter has completed the unit measurement and brought the lobe 87 of the cam 84 into engagement with one of the contacts 85 and breaks the circuit. The opening of these contacts 85 deenergizes the coil 46 and closes the valve 42 exactly at the completion of the last unit of measurement, thus stopping the meter 38 and stopping the cam 84 in position to hold the contacts 85 apart to maintain the valve 42 in closed position.

The description thus far given is intended to explain the general arrangement and operation of the system in its preferred form in which the selective and interlocking devices about to be described are included.

Referring now to Figs. 1, 2 and 3, the auto-stop register and dispensing unit of the system, which have been described above broadly, preferably form parts of the system which includes the apparatus and devices for interconnection of metering stations with billing machines and office registers for registering and recording quantities dispensed at different metering stations and for selectively registering and recording such quantities on different billing and registering machines.

In Fig. 2 the auto-stop register shaft 28 is shown provided with an electrical locking means 100 which, when energized, is adapted to lock the shaft 28 so that the setting of the numeral wheels of register 10 by operation of handle 26 cannot be changed once the lock 100 is energized. The lock 100 may comprise any suitable electromagnetic locking arrangements.

The visual register 12 is provided so that the amount which has been dispensed during a dispensing operation can be readily determined. The printing wheels 14 are driven in any suitable manner in unison with the corresponding wheels of the visual register 12. For purposes of illustration the drive to the visual register 12 and the printing wheels 14 is shown transmitted from worm gears 101 and 102 through suitable friction clutches 103 and 104 to the units wheels driving sleeves 105 and 106 respectively.

The printing mechanism of the billing machine includes in addition to the printing wheels 14, a printing hammer 110 and paper guiding frames 112 disposed between the hammer and the printing wheels. Suitable means are provided to support a roll of paper 115 which is fed between rolls 116 and 118 to the frames 112.

The operation of the printing hammer 110, the resetting of the printing wheels, as well as of the usual register, and the feeding of the paper 115 are effected by a motor 120. The motor 120 has a drive shaft 121 rotated in the direction of the arrow which carries a mutilated gear 122, the teeth of which are adapted to mesh in successive order with a pair of gears 125 and 124. The gear 125 is fastened on shaft 107 and the gear 124 is carried by a shaft 126 having a cam 128. The hammer 110 is provided with an arm 130 having a roller 132 engageable by the cam 128 to raise the hammer 110 to cocked position and to release it at a proper time in the operation of the machine to effect the printing of a ticket.

The shaft 126 is also provided with a mutilated gear 134 which is adapted to drive a gear 135 to rotate the paper feeding roll 118 during the cocking movement of the hammer. The operative relationship of the printing mechanism will be described hereinafter in connection with the operation of the billing machine.

The gear 125, which is driven by one part of the rotation of the gear 122, driving through shaft 107 and sleeve 105 thereon and through known wheel pick-up means, is adapted to reset to zero the number wheel of the visual register 12. The number wheels of the set of the register 12, and also the printing wheels of the set 14, are suitably connected in each set for counting operation by known transfer mechanism described in connection with the auto-stop register 10.

The printing wheels 14 are reset by the motor 120 from the shaft 107 through a gear 140, a pinion 141 and a gear 142 carried on a shaft 108 which extends through the sleeve 106 to the wheels 14. As hereinafter described, the resetting of the visual wheels and of the printing wheels by the motor 120 takes place just prior to bringing the machine to condition for initiation of the metering step of a dispensing operation. When said metering step is completed, another driving movement of the motor 120 effects the tripping of the printing hammer, to record the amount dispensed, and a subsequent feeding of the paper 115 to leave the devices ready for a subsequent operation.

The control of the operation of the billing machine is normally dependent upon the operation of a contact switch 150, illustrated in various positions in Figs. 2, 4 and 5, associated with a switch actuating arm 152 of the selecting mechanism to be hereinafter described, and upon operation of a second contact switch 160, illustrated in various positions in Figs. 2, 5 and 6. The contact switch 150 comprises two stationary contacts 153 and 154 and a movable contact 155 carried by a resilient leaf or stem 156, which is engageable by two control elements 157 and 158. The control elements extend through opposite walls of the switch box, the element 157 being movable by the actuating arm 152 of the selecting mechanism and the element 158 being under control of a cam 159 fastened upon shaft 121 of motor 120 to rotate therewith.

The second contact switch 160 comprises a stationary contact 161 and a movable contact 162 carried by lever 162a urged to contact position by spring 167. The element 163 is engageable by a rod 165 suitably mounted in a frame element 166 of the machine and engaged at the other end thereof by a cam 168 carried on the shaft 121 of the motor 120 to rotate therewith. The rod 165 is provided with a spring 169 which engages the frame 166 to bias the rod against the surface of the cam 168.

Before tracing the wiring connections of the switches 150 and 160, it is believed desirable next to describe the selective mechanism and the connected relationship of the wiring with respect to one of the loading stations.

In Fig. 3 the selective mechanism for the billing machine A is shown associated with a part of the selecting mechanism of the billing machine B to illustrate the interlocking connection therebetween and to one of the loading stations. As shown in Figs. 1 and 3, the selecting mechanism of the billing machine A comprises four buttons numbered 1, 2, 3 and 4. The button #1 comprises an elongated element 180 having a plurality of contacts which are associated with a corresponding number of stationary contacts. The inner ends of the elements 180 of the buttons #1 to 4 are adapted to engage an actuating member 182 which is fastened upon a stud slidable in frame member 183. The stud of member 182 carries fastened on the other end thereof the actuating arm 152, and as shown in Fig. 2 the arm 152 is adapted to engage the switch element 157. The member 182 is provided with a spring 184 which returns the member and any actuated button to inactive position when the button is released.

Supported on the member 182 is a contact 181 adapted when the member 182 is actuated by a button to close with a contact 185 to complete a circuit for the lock 100 on the auto-stop register 10. The circuit may be traced from source 50 through wires 212, 218, 192, contacts 181, 185 and wire 194 to the lock and ground. Whenever the selecting mechanism is actuated by pressing a button the lock 100 is energized and prevents change in the presetting of the register. It is necessary, therefore, in the embodiment of the invention being described, to preset the auto-stop register by operating handle 26 prior to pressing a button, such as button #1, for a selected loading station.

Each button is provided with a roller 186 disposed between two controlling surfaces, the roller 186 of the button #1 being shown disposed between the surface of a stationary frame element 187 and the inclined surface of a sector 190 pivoted at 191. A series of such sectors are provided, one adjacent the other, depending upon the number of buttons, the lowermost roller being disposed between one of the sectors and a frame element as in the case of button #1. The sectors are restricted in movement by the frame members, so that only one roller 186 is movable to button actuated position at a time. This arrangement provides an interlock so that the selected billing machine can only be connected to one loading station at a time.

To maintain the button in the inner or actuated position once it is pressed, each element 180 is provided with a shoulder 196 engageable by a pawl 197 which is biased toward out of engagement position by a spring 198. To lock the button in actuated position, an electro-magnetic coil 199 is disposed adjacent each pawl. The coils are connected in series with motor 120 between line 50 and ground. They may be shorted, however, upon actuation of the button by circuit connections hereinafter described and by operation of switches 150 and 160 above referred to. The energization of the coil 199 acting upon the armature provided by the extension 197a of pawl 197, urges the pawl against the pull of spring 198 into locking position with the element 180 and maintains the element locked until the coil is deenergized or shorted.

Since the wiring connections for the several buttons of a given billing machine are the same, the description of the wiring connections of one of the buttons will suffice for the other buttons. Button #1 is provided with a series of contacts movable therewith to control the opening and closing of a number of circuits. The contacts are identified in Fig. 3 as 200, 201, 202, 203, 204, 205 and 206. The coresonpding contacts of #1 button of the machine B are identified as 300 through 306 inclusive. The source of power to these contacts is controlled by the two sets of contacts 210 and 211 actuated by the auto-stop register 10 as above broadly described and interlocking circuits are provided connecting contacts 210 and 211 with the series of contacts on the corresponding buttons, e. g. buttons #1, of the several billing machines of the system.

The contacts 210 associated with the rack 54 are closed when the followers 32, 33, 34 thereof are received in the recesses 27 of the cams 22, 23, 24 associated with the tens, hundreds and thousands numeral wheels. The contacts 211 are actuated by the bell crank arm 175 of the follower 31 associated with the units wheel 20. The contacts 210 are adapted to be opened when the auto-stop register reaches the point of starting the last 10 units of registration of the predetermined amount for which it has been set. The contacts 211 remain closed during the last ten units of registration and are opened when the units wheel of the register has reached its zero position.

Following the circuit through the contacts 210 from the source of electric current 50, the current is supplied through wire 212, contacts 210, wires 214 and 215 and normally closed contacts 305 of the corresponding button #1 of machine B, thence through a wire 307 to one of the contacts 200. The contact 305 and wire 307 and contacts 200 constitute one portion of the interlocking connection between the corresponding buttons of the billing machines. The other of the contacts 200 is connected by a wire 216 to the manually actuatable switch 47 and thence to the coil 45 of the main valve 40 and to ground at 52. Thus, in order for the actuated button #1 of machine A to complete a circuit from the source of electricity 50 to the main valve 40 of metering station #1, the corresponding button #1 of machine B must be in its outer or inactive position.

The other portion of the interlocking connection may be traced from the control switch 150. The source of current 50 is connected to the movable contact 155 of the switch 159 through wires 212 and 218. Assuming that the auto-stop register 10 has just been preset so that the units wheel 20 is in the numerical position shown in Fig. 2, the contacts 211 will be closed. When a button, such as button #1 in Fig. 3, has been pressed, thus closing contacts 153 and 155 by pressure of element 157 the motor 120 is energized to reset the register 12 and the printing wheels 14, an operation which is performed quickly and while the button is manually pressed. In this rotation the cam 159 is rotated and the switch 150 will be moved to the position indicated in Fig. 5 by action of the cam 159 relieving pressure upon element 158, the end portion of the stem 156 pivoting upon the end of element 157. The movable contact 155 in this position will be closed with stationary contact 154 and the current from the source 50 hereinbefore traced to the contact 155 now will pass through the contact 154 and wire 220 to the contacts 211, thence through wires 221 and 222 to the contacts 305 of the machine B. Since the contacts 306 are closed when the button #1 of machine B is in its inactive position, the circuit continues through wire 308 to contacts 201, 202, 203 and 204.

From the foregoing it will be seen that in order for the contacts 200, 201, 202, 203 and 204 of machine A to complete circuits to #1 loading station, the button #1 of the machine B must be in its inactive position. Likewise, in order for button #1 of machine B when pressed to complete circuit to #1 loading station, the button #1 of machine A must be in its inactive position. This interlocking control of the button #1 of machine B by button #1 of machine A is effected by the contacts 205 and 206, these being opened by operation of button #1 on machine A.

From the wire 214, which as above described is connected through register operated contacts 210 to the current supply lead 50, a wire 224 connects to one of the contacts 205 and the other contact 205 is connected by wire 225 to one of the contacts 300 of the machine B. This interconnection controls the circuit connection of contacts 300 of machine B through wire 316 to wire 216 and thence to the manual switch 47 in control of the valve 40. It is necessary, therefore, that contacts 205 be closed by button #1 of machine A in released position and contacts 300 be closed by button #1 of machine B in pressed position for the connection of machine B to loading station #1.

From the wire 221, which as above described is connected through register operated contacts 211 and switch contacts 154 and 155 to the current supply lead 50, a wire 226 is connected to the contacts 206 which in turn are connected through wire 227 to the contacts 301, 302, 303 and 304 of machine B. This completes the interconnection between two corresponding buttons of the two machines, it being necessary that button #1 of machine A be in released position and button #1 of machine B in pressed position to complete the circuit for operation of machine B.

The wires 214 and 221, though not so shown in Fig. 3, of course are connected also to the switch contacts of the auto-stop register of the machine B corresponding to contacts 210 and 211 of machine A and thence to lead 50 in circuits similar to those above described for machine A. The interconnection such as that described between corresponding buttons #1 of the two machines A and B may be utilized for the other corresponding buttons of the two machines, although, for simplicity, the contacts and circuits are not shown in the drawing. Where more than two machines are provided each button of a machine controls the corresponding buttons of all the other machines in the manner described, by extension of leads 214 and 221 to connect these other machines in parallel with those shown in Fig. 3.

Having traced out the control of contacts 200 and 300 to the main valve 40, the other control contacts of buttons #1 of machines A and B will now be traced. From contacts 201 a wire 231 is connected to the manual control switch 57 which controls the coil 46 of the auxiliary valve 42. The corresponding contacts 301 of machine B are likewise connected by a wire 331 which is connected to the wire 231 for control of the auxiliary valve 42.

Contacts 202 are connected by a wire 232 to lamp 16 adjacent #1 button and to a lamp 240 associated with the meter 38 so as to indicate at the machine A that station #1 is connected thereto and to indicate at the station #1 that the billing machine A is connected to said station. The illumination of the lamp 240 also indicates to the driver or operator at the loading station that the auto-stop register has been preset and locked, the visual register and printing wheels have been reset and the billing machine is now ready for the metering step of the dispensing operation, that is, for delivery. A circuit over wire 332, similar to that connected by wire 232, is connected between contacts 302 and a lamp 16B on machine B and a lamp 241 at the loading station.

Contacts 203 are connected by a wire 233 to the motor 74 of the machine A. The motor, as hereinbefore described, is energized continuously during a dispensing operation under control of the machine A whether or not clutch 72 is engaged. Likewise, the contacts 303 of the machine B are connected by a circuit 333 to the driving motor (not shown) of the machine B.

Contacts 204 are connected by a wire 234 to contacts 235 under control of a cam 64a driven by the meter 38. From the contacts 235 a wire 236 leads to the time delay relay 67 which controls the operation of the clutch actuating relay 71, as above described. A wire 334 similarly leads from the contacts 304 of the machine B through contacts 335 likewise controlled by the operation of the cam 64a to operate the clutch actuating relay (not shown) of the machine B.

Each loading station is provided with a unit synchronizing circuit which is controlled by the meter of that loading station by means of cam 84 which actuates the contacts 85 of the synchronizing circuit as above described. The contact engaging relation of the cams 64a and 84 is such that, prior to the starting of each new unit measurement by the meter 38, the register-controlling cam 64a has closed the contacts 235 to actuate the relays 67 and 71 and move the auto-stop register one unit. To this end the cam 84 is arranged angularly displaced upon shaft 62 to lag behind the cam 64a and so as to open the synchronizing circuit 61 to open valve 42 substantially at the termination of the last unit measurement but after the auto-stop register 10 has completed registering the last unit measurement of a predetermined amount for which it has been set. The cam 64a may have sufficient length along shaft 62 to provide for a plurality of contacts 235, 335 according to the number of billing machines which are to be operated selectively in connection with the loading station at which meter #1 is located.

Summarizing the operation of the system, it will be assumed that, first, the auto-stop register 10 has been preset to dispense five units or gallons of liquid and that button #1 of machine A then has been pressed to its inner position, thereby selectively connecting the machine A to the meter 38 of station #1. Also assume that the register 12 and the printing wheels 14 indicate, for example, 2500 units from the previous operation. Under this setting of the auto-stop register 10, it will be noted that the contacts 211 are closed while the contacts 210 remain open. If a larger number, such as 10, 100 or 1,000 gallons were to be dispensed, the register would then be preset to indicate the appropriate amount and both sets of contacts 210 and 211 would be in closed position since both sets of followers would then be in their outer positions. The initial actuation of the button actuated member 182 closes contacts 181, 185 to lock the auto-stop register setting as previously described.

As shown in Figs. 2 and 3, the actuating arm 152 has responded to the pressing of button #1 to move the element 157 against the stem 156. Since, upon completion of the previous dispensing operation and before reset of visual register 12 and printing wheels 14, the element 158 is also urged against the stem 156, the stem is distorted upon pressing button #1, by being pressed against element 157 so that contact 155 is moved out of engagement with stationary contact 154 (Fig. 4) and into engagement with contact 153 (Fig. 2). In this position of the switch 150, a circuit is completed to the motor 120 from the source of power 50 through wires 212 and 218, contacts 155, 153 and wire 245 to the motor 120 and thence to ground at 246. The motor 120 is energized and rotates the cam 159 in the direction of the arrow until it moves to the position shown in Fig. 5 whereupon the element 158 is released and the stem 156 permitted to straighten thereby disengaging contact 153 and reengaging contact 154. The surface of the cam 159 is shaped to maintain the contact 155 in engagement with contact 153 for a length of time to effect a motor driving movement of substantially 180° and then to release element 158 as just described.

This rotation of the motor shaft 121 drives the mutilated gear 122 from its position as in Fig. 2 to a position 180° displaced therefrom. The gearing provided is such that this rotation is sufficient to reset the register 12 and the printing wheels 14. The transfer of resetting movement to the visual register 12 is effected through the gear 125 and the shaft 107. The transfer of resetting movement to the printing wheels 14 is effected from shaft 107 to shaft 108 through gears 140, 141 and 142. The pick-up connections between the shafts 107 and 108 and the number wheels thereon may be of known construction.

Upon completion of the resetting movement of the motor 120, the cams 159 and 168, therefore, assume the position shown in Fig. 5. The position of the movable contact 155 in engagement with the stationary contact 154 (Fig. 5) thus conditions the system for registering operation with the loading station corresponding to the button #1 which has been pressed.

The button is held in pressed position by the electro-magnet 199 which is continuously connected in the circuit traceable from the source of power 50 through wires 212, 218 and 256, electromagnet 199, wires 257 and 245, motor 120 and ground 246. The resistance of the electromagnet 199 is designed to be so high, however, that insufficient current will flow through the circuit to drive the motor 120. The electro-magnet 199 thus energized, is capable, nevertheless, of attracting its armature, shown in the drawing as an extension 197a of the pawl 197 on the opposite side of its pivot, and thereby of forcing the pawl 197 into the recess 196 against the action of the spring 198 so as to hold the button #1 in pressed position whenever the button is pressed. When, however, the motor 120 is energized by any of the circuits including either the switch contacts 155, 153 (Fig. 2), or contacts 161, 162 or manual switch 260, the circuit to the electromagnet 199 is shorted, resulting in a sufficient decrease in current flowing through magnet 199 for the spring 198 to overcome the pull of the electro-magnet and release the button.

The manual switch 260 interposed between wires 218 and 269 enables an attendant at the machine to print a ticket should an amount less than that for which the machine is set be desired after an operation has once been started. For example, should the driver decide to take a smaller amount than first requested, he may stop delivery by opening switches 47 and 57. The closing of valves 40 and 42, however, will not stop delivery at a fraction of a unit, the delivery continuing under control of the synchronizing circuit 61 until the full last unit of measurement passing the meter at the moment of interruption is completed. Thereafter, the ticket may be issued by momentarily closing switch 260 to energize the motor 120.

With the button #1 of machine A in the position shown in Fig. 3, the contacts 200, 201, 202, 203 and 204 are closed and the contacts 205 and 206 are open. The closed contacts connect machine A to loading station #1 and the two open contacts prevent machine B from being connected to the same loading station. Since the auto-stop register is set for five units in the example being described, the contacts 210 are open so that no current will flow through contacts 200 by way of contacts 305 to the controlling coil 45 of valve 40 when the switches 47 and 57 are closed by the driver or station operator. Current, however, will flow to contacts 201, 202, 203 and 204 by way of contacts 306 since the contacts 155, 154 (Fig. 5), contacts 211 (register 10) and contacts 306 are closed. The circuit of contact 201 is thereby completed down to the manual switch 57; the circuit of the contact 202 is completed through wire 232 to the lamps 16 and 240 which are thereby illuminated; the circuit of contacts 203 is completed through wire 233 to the driving motor 74 of the billing machine; and the circuit of contacts 204 is completed through wire 234 to the contacts 235 actuated by cam 64a operated by the meter as above described.

When the driver is ready to accept delivery, after the presetting and selecting steps are completed at the machine as above described, he may do so by actuating the switch button 17 thereby completing the circuit through contacts 57 to the electro-magnetically controlled valve 42 which is thereupon opened allowing liquid to flow through the meter 38. The cam 64a closes the contacts 235 once during each unit measurement, that is, it will close said contacts five times in the example assumed in this summary during the operation of dispensing five gallons. Closing of contacts 235 will transmit an electrical current through the wire 236 to the relays 67 and 71 to actuate the clutch 72. As previously described, each actuation of the clutch 72 effects a step in the driving movement to the shaft 75 sufficient to move the number wheels of the auto-stop register 10, the visual register 12 and the printing wheels 14 one unit registration. When the auto-stop register has been driven sufficiently to return the units wheel 20 from the fifth position to zero, thereby indicating completion of registration of the five units of liquid, for which the machine was preset, the follower 31 is received in the recess 27 of the units wheel cam 21 and the contacts 211 opened and the contacts 266 closed. The opening of contacts 211 deenergizes the circuit leading to the contacts 201, 202, 203 and 204. This deenergizes the circuit to the manual switch 57, the circuit to the lamps 16 and 240, the the circuit to the motor 74, and the circuit to the contacts 235. No further registration for this operation is now possible on the billing machine and the registration is completed ready for printing. The valve 42, however, is not immediately closed since the synchronizing circuit 61 remains closed until the meter has moved to a position to open the contacts 85. Flow, therefore, will continue through valve 42. When the meter moves to the position where the last unit of the five units being measured is complete, the contacts 85 will be opened by the cam 84 and the coil 46 will be deenergized to close the valve 42. Closure of valve 42 effects final stoppage of flow through the meter 38, thus stopping rotation of cam 84 with its point 87 holding contacts 85 open until flow through the meter again takes place in a succeeding dispensing operation.

As above stated, upon completion of the resetting movement by the motor 120 the cam 168 will be in the position shown in Fig. 5. In this figure the parts are shown in position for the metering and registering operation. As there shown the rod 165 is urged against the cam 168 by spring 169, the element 163 following the rod 165 under the pressure of the spring 167 acting upon the switch lever 162a. The contacts 161 and 162 thus are in the closed position.

When, therefore, upon completion of the metering and registering operation contacts 266 are closed by the auto-stop 10, as above described, a circuit will be completed from the source of power 50 through wires 212, 218 and 267, contacts 266, wire 268, contacts 161, 162 and wire 269 to the motor 120. The motor thereupon is energized to rotate the mutilated gear 122 through an arc of 180° from the position to which it was moved in the resetting operation above described to return it to the position shown in Fig. 2. In the resetting movement the gear 122 is out of engagement with gear 124. In this return rotation of the gear 122, however, this gear drives the gear 124 in the direction of the arrow and thus effects rotation of the cam 128 and tripping of the hammer 110 to impress the amount indicated by the printing wheels 14 upon paper disposed in the frames 112. The ratio of the drive may be such that shaft 126 is rotated a full revolution in the 180° return rotation of gear 122. The cam 128 therefore is returned to the position shown in the drawing ready for the next printing operation.

During the continued movement of the gear 124 the mutilated gear 134 is brought into driving engagement with the pinion 135 carried on the shaft 119 of the feeding roll 118. The relation of these parts is such that gear 134 engages pinion 135 after the cam 128 by its continued rotation has again lifted the hammer 110 clear of the paper. Rotation of roll 118 and its counter roll 116 effects feed of the paper through the printing frames 112, thereby issuing the printed portion and replenishing the frame with a new ticket portion. The ticket portion thus issued and bearing the record of the amount dispensed may be severed from the strip of paper.

The printing mechanism, of course, may include printing elements other than the wheels 14 to indicate the date, the loading station from which the dispensing operation has taken place and any other data that may be desirable.

It is also possible to provide a second set of registering wheels and printing wheels, similar to 12 and 14, to indicate and to print on the ticket the total cost of the fluid delivered. These cost-indicating wheels would be driven from shaft 95 through a variable-ratio gear box, the driving ratio being adjustable to accord with the unit price of the fluid being dispensed.

The driving movement of the motor 120 for the printing and issuing of the record as above described moves the cams 159 and 168 from the position shown in Fig. 5 which they have held during operation of the meter to the position indicated in Fig. 2. The element 158 thereby is urged by cam 159 inwardly against the stem 156 and the contacts 153 and 155 again are closed by bending of the stem against the element 157. The motor 120 thus is energized through these contacts and would continue to run but the electromagnet 199 becomes shorted by the energization of the motor 120 and releases the button #1, thereby releasing the element 157, so that the contact 155 is moved again to contact 154 in the position shown in Fig. 4. This breaks engagement with the contact 153. The motor, however, continues to run until the cam 168 assumes the position of Fig. 4 and urges the rod 165 and the element 163 downwardly to open contacts 161 and 162 against the bias of spring 167, thus opening the circuit to the motor previously established through these contacts and the closed contacts 266. All the circuits of the system thus become deenergized. As the contact 154 now is engaged by contact 155 and connected to the circuit which includes wire 220 and open contacts 211, the apparatus is conditioned for a subsequent operation.

From the foregoing description it will be apparent that the dispensing apparatus of this invention has particular utility for use in loading yards having a plurality of loading stations. It will also be apparent that many of the features of the invention are useful per se and with apparatus other than the particular dispensing system disclosed. For example, the system and its controls can be used in dispensing or otherwise handling solids on a belt conveyor or in dispensing or handling units of standard size, such as cans and packages. It is recognized, therefore, that many modifications and adaptations of the various features are possible without departing from the invention. It will, therefore, be understood that the forms of the invention herein illustrated and described are intended to be illustrative only and not to limit the scope of the appended claims.

We claim:

1. Dispensing apparatus comprising a plurality of registers, a plurality of measuring devices, a set of selective connecting elements for each register, each element of a set being actuatable to connect one of the measuring devices to the register with which the element is associated, means operatively connecting said elements and effective upon actuation of a given element of a set to render the other elements of the same set unactuable until the connection effected by said actuated element is discontinued, and means operatively connected to said given element when actuated and with the element of another set corresponding to the same measuring device when said other element is unactuated for establishing the connection to said measuring device of the register with which said given element is associated and disestablishing said connection upon actuation of said other element.

2. Dispensing apparatus comprising a register, a plurality of measuring devices, selective connecting means operatively connected to said register and said measuring devices and including a plurality of actuatable elements in consecutively adjacent arrangement with respect to each other each operable to connect a corresponding measuring device to said register, a plurality of cam lobes disposed in a consecutively adjacent arrangement with respect to each other, each of said elements having a portion movable into engagement with two adjacent lobes upon actuation of said element, and means providing limited movement of said cam lobes to effect interengagement of said lobes and said actuated element so that only one of said elements is actuatable at a time to a selective position between two of said lobes.

3. Dispensing apparatus comprising an autostop register, means to preset said register, a plurality of measuring devices, a plurality of elements respectively operatively connected to said measuring devices and operatively connected to said register and respectively actuatable for selectively connecting said register for operation in conjunction with the respective measuring devices, and means responsive to actuation of any of said elements to lock the preset means of said register.

4. Dispensing apparatus comprising a register, a plurality of measuring devices, selective connecting means associated with said register including a plurality of actuatable elements each operable to connect a corresponding measuring device to said register, means operatively connected to said elements and operable upon actuation of any selected element for holding the actuated element in connecting position, means actuated by said selected element and operatively engaging said elements for preventing actuation of any other element while said selected element is held in connecting position, and means operatively connected to said register and to said elements and operable upon completion of the registration by said register for effecting release of said element from said holding means to discontinue connection of said measuring device to said register and to disengage said element from said preventing means.

5. Dispensing apparatus comprising a plurality of registers, a measuring device, a plurality of elements respectively associated with and operatively connected to said registers and operatively connected to said measuring device and respectively actuatable for selectively connecting the respective registers for operation in conjunction with said measuring device, means for controlling delivery of material to be measured through said device, means for each register operatively connected thereto and settable from an initial position to a position corresponding to the amount to be measured and operated during the registering operation to return to said initial position, means operatively connecting said settable means to said delivery control means in all setting positions of said settable means to control said delivery control means to maintain delivery of said material but disconnecting said settable means from said delivery control means so as to be ineffective to maintain delivery of said material when said settable means is in said initial positon, means actuated by sad measuring device at intervals corresponding to completion of each unit of measurement by said measuring device and connected to said delivery control means and to said settable means so as to be effective when said settable means is in said initial position to operate said delivery control means to continue delivery of said material throughout the current unit of measurement but to stop delivery of said material at the completion of said current unit of measurement, and means actuated by the respective settable means and operatively connected to the respective elements when actuated and effective when said settable means is in said initial position to deactuate said actuated elements to disconnect said connected register from said measuring device, said means actuated at intervals by said measuring device thereafter operating said delivery means to complete said current unit of measurement and to stop delivery, thereby to complete delivery of said material in full units of measurement as registered by said register.

6. Dispensing apparatus comprising a plurality of registers, a measuring device, a plurality of elements respectively operatively connected to said registers and operatively connected to said measuring device, said elements being respectively actuatable selectively to connect the respective registers for operation in conjunction with said measuring device for registering the measurement of said measuring device, and means operatively connecting a selecting element of a given register and a selecting element of a second register and cooperating with said elements to maintain connection of said given register to said measuring device while said selecting element of said given register remains actuated and said selecting element of said second register remains unactuated, said connecting means cooperating with said elements to disconnect said registers from said measuring device upon actuation of said selecting element of said second register while said selecting element of said given register remains unactuated.

7. Dispensing apparatus comprising a plurality of registers, a measuring device, an element associated with each register and operatively connected thereto and to said measuring device and selectively actuatable conditionally to connect its register to said measuring device for registering the measurement of said measuring device upon completion of said connection of said register to said measuring device, means associated with each register and settable from an initial position to a selected position corresponding to the amount to be measured by said measuring device and operatively connected to said register to operate during registering operation to return to said initial position, means actuated by said settable means and cooperating with said actuated element to effect said conditional connection of said register to said measuring device upon setting of said settable means from said initial position to said selected position, resetting means respectively associated with and operatively connected to said registers and to the respective elements associated therewith and actuated upon actuation of a selected element associated with a given register conditionally connecting said given register to said measuring device for effecting resetting of said given register prior to initiaton of the dispensing operation, said resetting means of said given register being operatively connected to said means actuated by said settable means associated with said given register so as to complete said connection of said given register to said measuring device upon completion of said resetting operation and to initiate the dispensing operation, and means actuated by said settable means upon return thereof to said initial position to disestablish said operative connection of said given register to said measuring device.

8. Dispensing apparatus as defined in claim 7 which comprises means operated by said settable means upon return thereof to said initial position for recording the registration by said register of the said measurement effected by said measuring device.

9. Dispensing apparatus as defined in claim 7 which comprises means actuated by said settable means upon return thereof to said initial position for effecting release of said actuated element.

10. Dispensing apparatus comprising a plurality of registers, a measuring device, an element associated with each register and operatively connected thereto and to said measuring device and selectively actuatable to connect its register to said measuring device for registering the measurement of said measuring device, energizable means associated with each register and operatively connected thereto and to said measuring device and capable upon being energized of effecting registering operation of the register associated therewith in accordance with measuring operation of said measuring device, the element associated with a given register being operatively connected to said energizable means associated with said given register and being operatively connected to the element associated with another register for effecting energization of said energizable means associated with said given register upon actuation of said element associated with said given register when said element associated with said other register is in unactuated condition, said operative connections between said elements associated with said registers and said energizable means being adapted when said element associated with said given register is maintained in actuated condition to effect deenergizaton of said energizable means associated with said given register upon actuation of said element associated with said other register which normally would connect said other register to said measuring device.

11. Dispensing apparatus comprising a plurality of registers, a measuring device, elements respectively associated with said registers and separately actuatable to and from positions for connecting the respective registers to said measuring device, an electrical circuit including contacts actuated by said registers and contacts actuated by the respective elements associated therewith, said circuit having connected therein a plurality of electrical means respectively operatively connected to said registers and energizable to effect operation of the respective registers, certain of the contacts actuated by said elements of the respective registers upon actuation of a selected element to connect a selected register to said measuring device being connected in said circuit with other contacts of the elements respectively associated with the other registers when unactuated and being connected to said electrically energizable means of said selected register to effect operation thereof, said contacts of said unactuated elements being connected in said circuit so as to deenergize said electrically energizable means upon actuation of any initiially unactuated element.

12. Dispensing apparatus comprising a plurality of registers, a measuring device, an element associated with each register and operatively connected thereto and to said measuring device and selectively actuatable to connect its register to said measuring device for registering the measurement of said measuring device, each element being operatively connected to and effective upon actuation thereof to close an electrical contact and open another electrical contact, said contacts respectively being opened and closed upon deactuation of said element, electrically energizable means associated with each register and operatively connected thereto and to said measuring device and energizable to effect registering operation of the register associated therewith in accordance with measuring operation of said measuring device, and an electrical circuit associated with each register and including said energizable means associated with said register, each circuit including a contact of an element of a given register which is closed upon actuation of said element of said given register and a contact of an element of another register which is opened upon actuation of the element of said other register, said contacts being connected in said circuit so that upon actuation of said element of said given register with said element of said other register unactuated the circuit is completed to said electrically energizable means to energize said energizable means to effect said registering operation by said given register of the measurement by said measuring device and is interrupted upon actuation of said element of said other register, whereby only said given register may be connected to said measuring device to effect registering operation by said given register of the measurement by said measuring device.

13. Dispensing apparatus comprising a plurality of registers, a measuring device, electrically energizable delivery means connected to said measuring device and energizable to effect delivery of material to be measured through said measuring device for measuring operation of said measuring device, an element associated with each register and operatively connected thereto and selectively actuatable to connect its register to said measuring device to register the measurement of said measuring device, an electrical contact associated with each element operatively connected thereto to be closed upon actuation of said element, a second electrical contact associated with each element operatively connected thereto to be opened upon actuation of said element, said contacts respectively being opened and closed by deactuation of the elements with which they respectively are associated, and an electrical circuit connecting said electrical energizable delivery means and a contact closed upon actuation of an element associated with a selected register and a contact closed upon deactuation of an element associated with a second register, said circuit being established so that upon actuation of said element of said selected register the circuit to said electrically energizable delivery means is completed to energize said delivery means to effect said delivery of material to be measured and is interrupted upon actuation of said second element so as to stop said delivery.

14. Dispensing apparatus as defined in claim 12 in which said registers each are presettable to an amount to be dispensed, and contacts respectively associated with and actuated by said presettable registers to closed and open positions respectively upon setting thereof and upon completion of the registering operation thereof, said register actuated contacts being connected in the respective circuits which include said contacts of the elements respectively associated with said registers to effect energization of said electrically energizable means concomitantly with initiation of the registering operation and to deenergize said electrically energizable means upon completion of said registering operation.

15. Dispensing apparatus as defined in claim 12 in which said registers each are presettable to an amount to be dispensed, contacts respectively associated with and actuated by said presettable registers to closed and open positions respectviely upon setting thereof and upon completion of the registering operation thereof, said register actuated contacts being connected in the respective circuits which include said contacts of the elements respectively associated with said registers to effect energization of said electrically energizable means concomitantly with initiation of the registering operation and to deenergize said electrically energizable means upon completion of said registering operation, and means respectively actuated by said presettable registers and operatively connected to the respective elements of said registers and effective upon completion of said registering operation thereof for deactuating said actuated element.

16. Dispensing apparatus as defined in claim 13 in which said registers each are presettable to an amount to be dispensed, and contacts respectively associated with and actuated by said presettable registers to closed and open positions respectively upon setting thereof and upon completion of the registering operation thereof, said register actuated contacts being connected in the respective circuits which include said contacts of the elements respectively associated with said registers to effect energization of said electrically energizable delivery means concomitantly with initiation of the registering operation and to deenergize said electrically energizable means upon completion of said registering operation.

CHARLES S. HAZARD.
JOHNSON SHIPMAN.

REFERENCES CITED

The following references are of record in the file of this patent:

UNITED STATES PATENTS

| Number | Name | Date |
|---|---|---|
| 795,361 | McDonnell | July 25, 1905 |
| 1,005,555 | Kettering | Oct. 10, 1911 |
| 2,051,597 | Head | Aug. 18, 1936 |
| 2,116,777 | Brayer | May 10, 1938 |
| 2,250,326 | Carroll | July 22, 1941 |
| 2,319,444 | Crosby | May 18, 1943 |
| 2,379,785 | Bugg | July 3, 1945 |